UNITED STATES PATENT OFFICE.

ROBERT B. WOODWORTH, OF PITTSBURGH, PENNSYLVANIA.

WHEEL CONSTRUCTION.

1,090,184.  Specification of Letters Patent.  Patented Mar. 17, 1914.

Application filed March 20, 1911. Serial No. 615,598.

*To all whom it may concern:*

Be it known that I, ROBERT B. WOOD-WORTH, of Pittsburgh, in the county of Allegheny and State of Pennsylvania, have invented certain new and useful Improvements in Wheel Constructions, of which the following is a full, clear, and exact description, reference being had to the accompanying drawings, forming part of this specification.

My invention relates to the construction of wheels of the class shown and described in Patent No. 932,081, granted to me on August 24th, 1909, and more particularly relates to the construction of metal bull wheels used on drilling rigs employed in drilling Artesian, oil and gas or other deep wells. Heretofore, it has been the practice to construct such wheels wholly of wood to facilitate transportation, such wheels ordinarily being built at the place of use and being very heavy and cumbersome in order to obtain the necessary strength. In the metal wheels of this description, a decrease in weight and increase in strength is had, but the great over all dimensions of such bull wheels (as much as 8 feet in diameter) and an over all length of 12 to 15 feet makes such wheels difficult to handle in transporting from the place of manufacture to the place of use, or from place to place when being used, the parts forming such wheels being securely riveted together in the shop before shipment to the first place of use.

One object of this invention is to provide a bull wheel construction made in sections, so as to have in effect a "knock down" wheel construction, with the sections or separable parts arranged to be easily and quickly disconnected in dismantling and again assembled in place, as is required in moving the wheel from place to place.

Another object of my invention is to provide a sectional wheel construction having novel means for assembling the sections rigidly together in place and for maintaining the sections in assembled relation to each other during the severe and extended service to which such wheels are subjected when being used as a component part of a drilling rig employed in drilling deep wells.

A further object of my invention is to provide a wheel formed of metal and having hub and rim portions of novel construction by which the strength and stiffness of the wheels are materially increased without substantial increase in weight and a strong and durable wheel is obtained having a minimum amount of material.

A still further object of this invention is to provide a metal wheel construction formed of rolled metal shapes and standard manufactured materials which are easily and quickly obtainable from the stock of dealers in such materials.

Figure 1:
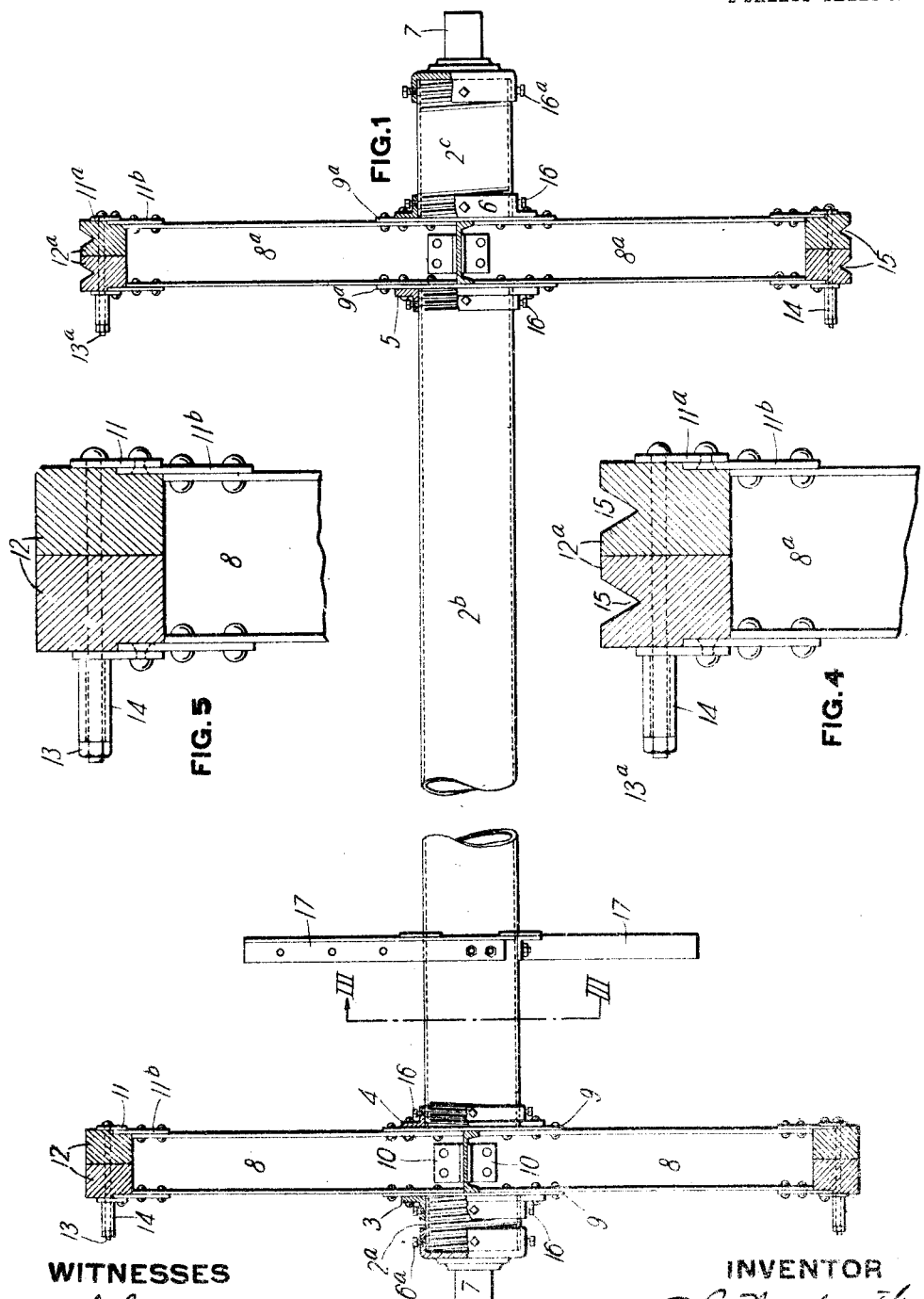
Figure 2:
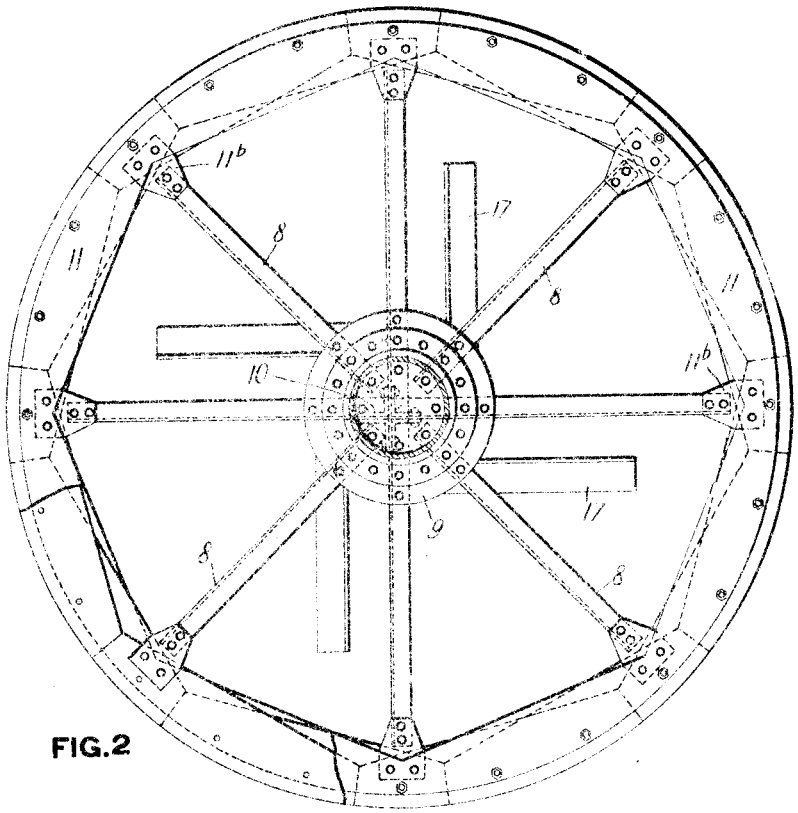
Figure 3:
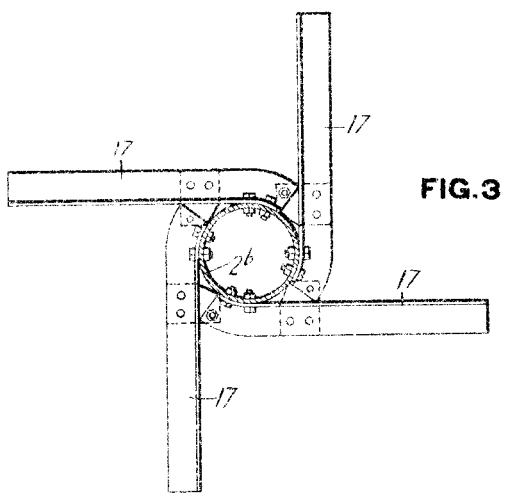

Referring to the drawings, Figure 1 is a sectional side elevation of a bull wheel constructed and arranged in accordance with my invention. Fig. 2 is an end elevation, partly in section, of the same. Fig. 3 is a sectional end elevation on the line III—III of Fig. 1 showing the way in which the radial arms located between the driving wheel and brake wheel are secured to the wheel shaft. Fig. 4 is a transverse section on a larger scale showing in detail the construction of the rim of the wheel for the driving rope and the way in which the grooved segmental wooden fillers or "cants" are secured together in place on the rope driven wheel. Fig. 5 is a similar view showing the construction of the rim of the brake wheel and the manner of securing the segmental wooden fillers or "cants" on the periphery of the brake wheel.

In the drawings $2^a$, $2^b$, $2^c$ designate the three several parts forming the sectional shaft, as made in accordance with my invention, in the bull wheel construction shown. The shaft preferably is formed of pieces of welded steel or iron pipe or tube, which forms a light, very strong construction, the number of pieces employed being varied as found necessary or desirable to facilitate handling and shipping. The ends of the intermediate, relatively long section $2^b$, and one end of the shorter sections $2^a$, $2^c$ of the shaft, which are screw threaded, are provided with threaded flanges 3, 4, 5 and 6 screwed into position thereon, the flanges being used to connect the shaft sections together and, detachably, to the hub portions of the brake wheel and driven rope wheel forming part of the bull wheel construction, as made in accordance with this invention. One end of the shaft section $2^b$ is provided with left hand screw threads and its flange 4 is correspondingly threaded, such construction being used to prevent unscrewing of the pipe section $2^b$ in the flanges 4 and 5 when the bull wheel is in use, and the left hand thread being located on the shaft in position to suit the direction in which the shaft is rotated under stress during the use of the bull wheel, in the construction shown this position being on the brake wheel end of the section 2. The outer ends of the shaft sections 2ª, 2ᶜ also are provided with screw threads, on which the internally threaded gudgeons or trunnions 7, 7 are screwed in being secured in place. The brake wheel is formed with spokes 8 made of radially extending rolled steel channels secured together at their inner ends by the rolled steel hub plates 9, 9 which are securely riveted to the flanges of the channels forming the spokes of the wheel. As shown the adjacent inner ends of alternate spokes are provided with angle connections 10 which are riveted in place on such spokes so as to connect the inner ends of such spokes together independently of the hub plates 9, 9.

Rim plates 11 are provided on opposite sides of the outer ends of the spokes 8, being secured in place by means of gusset plates 11ᵇ riveted to the ends of the spokes 8 and employed to connect the spokes with the rim plates 11. The peripheral edges of the rim plates 11 are sheared or formed to a curvature suitable for the diameter of the brake wheel of which the plates form part.

Secured in position at the outer ends of the spokes 8 to and between the rim plates 11 is a series of wooden segments or "cants" 12 which form the friction surface of the brake wheel, these "cants" being held in place by means of bolts 13 passing through suitable registering openings or holes provided therein and in the rim plates 11.

To afford means for manually moving the bull wheel on its trunnions 7, 7, a series of handles 14 project from one side of the brake wheel rim at intervals on the surface thereof, these handles preferably being formed of short pieces of pipe, held in place by bolts passing through the opening in the pipes and transversely through the rim of this wheel.

The driving wheel located adjacent to one end of the bull wheel shaft is provided with spokes 8ª formed of rolled steel channels secured together by angle connections 10 and riveted to the hub plates 9ª, 9ª, in the same manner as the similar parts of the brake wheel on the opposite end of the sectional shaft. The rim of the driving wheel is constructed of a series of rim plates 11ª secured in place on the outer ends to opposite flanges of the channel spokes 8ª and having wooden segments or "cants" 12ª secured between the rim plates 11ª by bolts 13ª in the same manner as described for the brake wheel.

The wooden rim of the driving wheel differs from that of the brake wheel in that instead of a plain peripheral surface, the driving wheel is provided with a plurality of circumferential V-shaped grooves 15 which when in service are engaged by the driving rope or ropes by which the bull wheel is actuated. It is obvious however that the grooves may be omitted from the rim of the driving wheel when a belt is employed to drive the bull wheel.

The flanges 3 and 4 bolted to the hub plates 9, 9, on the brake wheel and the flanges 5 and 6 which are attached in a similar manner to the hub plates 9ª, 9ª, on the driving wheel so as to afford ready means for disconnecting the sections, are each provided with a series of tap bolts 16 screwed into place in threaded openings in the flanges, the ends of the bolts 16 engaging with the threaded ends of the shaft sections 2ª, 2ᵇ, 2ᶜ, or entering into registering holes provided in the threaded ends of the pipe sections for that purpose, so as to effectively prevent "backing out" or unscrewing of the pipe sections in the flanges and maintain the over all length of the sections after the parts of the bull wheel are assembled and are placed in use. Similar tap bolts 16ª screwed in threaded openings provided in the gudgeons or trunnions 7 serve in a similar manner to prevent relative movement of the trunnions and the section of the shaft on which they are screwed and to maintain the over all length of the assembled bull wheel shaft.

At an intermediate point in the length of the shaft a series of arms is provided formed of rolled steel angles, one end of each being bent to conform to the curvature of the shaft and such bent ends being secured by rivets to the shaft. The arms 17 serve to divide the shaft between the brake wheel and driving wheel into two parts, one of which is used to hold the portion of the drill rope being used, the other serving to hold the spare or surplus length of such rope during the drilling operations.

The advantages of my invention will be apparent to those skilled in the art. The long, unwieldy and cumbersome bull wheels are easily and quickly taken apart and shipped in easily handled sections when made in accordance with my invention. The sections are readily assembled in the field in readiness for further use, as often as required. The use of the tubular shaft greatly lessens the weight of the apparatus without sacrifice in strength, while by connecting the sections forming the bull wheel together as shown and described, a bull wheel construction is had which is light, very stiff and strong, and which requires a minimum amount of machine work. The parts forming the bull wheel all being standard manufactured materials are easily and quickly obtainable.

Modifications in the construction and arrangement of the parts may be made without departing from my invention as defined in the claims.

I claim:—

1. A knock-down bull wheel comprising a middle shaft section and opposite end shaft sections, a spoked brake wheel interposed between the middle shaft section and an end shaft section, and a spoked driving wheel interposed between the other end of the middle shaft section and the other end shaft section, spokes of each wheel extending in between the adjacent shaft sections and connected with one another, and detachable connections between the said wheels and the respective shaft sections.

2. A knock-down bull wheel construction comprising a middle shaft section and opposite end shaft sections, a spoked brake wheel interposed between the middle shaft section and one of the end shaft sections, a spoked driving wheel interposed between the other end shaft section and the middle shaft section, spokes of each wheel extending in between the adjacent shaft sections, angle connections for the inner ends of said spokes, and detachable connections between the said wheels and the respective shaft sections.

3. A bull wheel construction comprising a middle shaft section and end shaft sections, a spoked brake wheel interposed between the middle shaft section and one of the end shaft sections, a spoked driving wheel interposed between the other end of the middle shaft section and the other end shaft section, each of said wheels having hub-plates, flanges on the ends of the middle shaft section and on the inner ends of the end shaft sections, the shaft sections being detachably connected to the hub-plates of the respective wheels, certain of the spokes of each wheel extending in between the adjacent shaft sections.

In testimony whereof, I have hereunto set my hand.

ROBERT B. WOODWORTH.

Witnesses:
 GERTRUDE SCHOTTE,
 ROBERT A. MARBLE.